Sept. 15, 1959  H. S. VAN BUREN, JR  2,903,815
FASTENING DEVICE
Filed Nov. 2, 1956

INVENTOR:
HAROLD S. VAN BUREN JR.,
BY Robert E. Ross
ATTORNEY.

2,903,815

FASTENING DEVICE

Harold S. Van Buren, Jr., Cambridge, Mass., assignor to United-Carr Fastener Corporation, Boston, Mass., a corporation of Delaware Application November 2, 1956, Serial No. 620,104

1 Claim. (Cl. 45—138)

This invention relates generally to fastening devices, and has particular reference to a fastening device for securing a panel to a support.

In the manufacture of automobiles, a fiber panel covered with cloth or plastic is used for covering the inside of the door. The methods of attaching these panels are varied but no one or a combination thereof have overcome the disadvantages created by rain water which enters through the window slot and seeps between the fiber and metal panels through the fastener hole with the resultant warping of the fiber panel and discoloration of the interior fabric. Consequently, it has been desirable to provide a fastener assembly which will deflect water passing down through the window slot away from the fastener hole and having the end of the fastener stud curved downward to prevent water collecting on the stud from entering the stud slot, and a fastener which can easily be adapted for blind assembly yet permits the panel to be removed for repair of the door or replacement of the panel.

The object of the invention is to provide a drip-proof panel fastener assembly which meets the above requirements in that it has a stud portion for blind assembly, the upper edge of the panel being hooded over the slot to deflect the rain water and the free end of the snap fastener portion being inclined downwardly to carry any water away from the fastener aperture.

Another object of this invention is to provide a panel fastener assembly in which the supporting sheet is provided with a slot to provide a tolerance of at least ⅜" to offset alignment difficulties in the assembly of the panel onto the supporting sheet.

A further object of this invention is to provide a panel fastener assembly in which the fastener retaining slot on the fiber is on a higher horizontal plane than the stud receiving aperture on the sheet metal supporting panel to eliminate continuity of these apertures and present a further obstacle to the passage of rain water onto the interior fabric.

A further object of this invention is to provide an automobile door assembly in which the sheet metal inner peripheral supporting partition has a series of horizontal slots disposed about the periphery, and the portion of the panel above each of the slots is deformed outwardly to provide a hooded structure to deflect rain water away from the fiber panel.

Other objects of the invention will, in part, be obvious, and will, in part, appear hereinafter.

Figure 1:
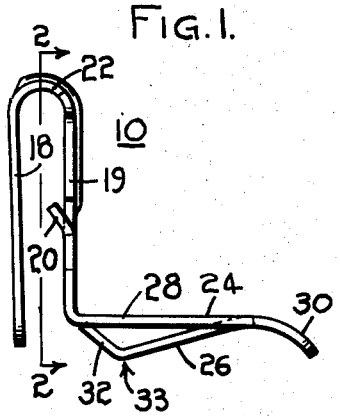
Fig. 1 is a view in side elevation of a fastening device embodying the features of the invention.
Figure 2:
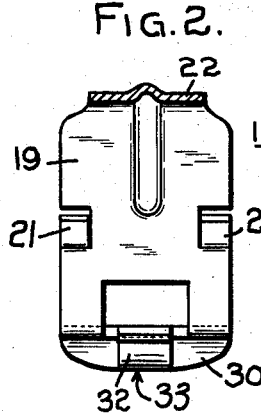
Fig. 2 is a view in section of the fastener of Fig. 1 taken on line 2—2 of Fig. 1.
Figure 3:
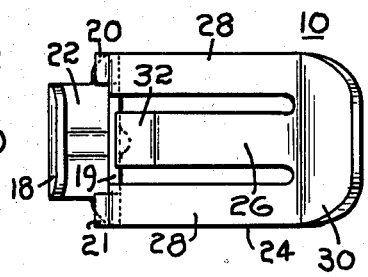
Fig. 3 is a bottom plan view of Fig. 1.
Figure 4:
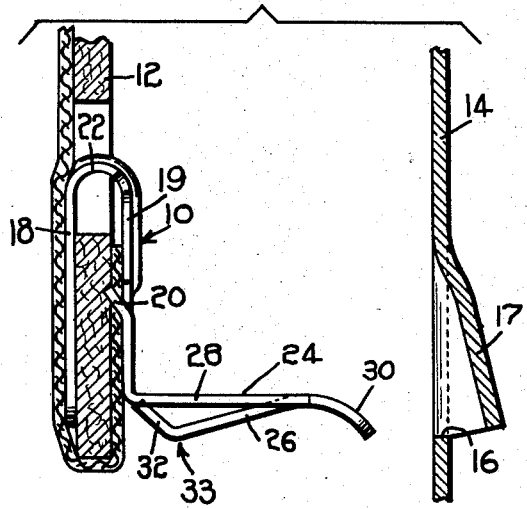
Fig. 4 is a view in elevation partly in section of the fastener of Fig. 1, assembled onto a trim panel and in position for assembly into a slot in a support panel.
Figure 6:
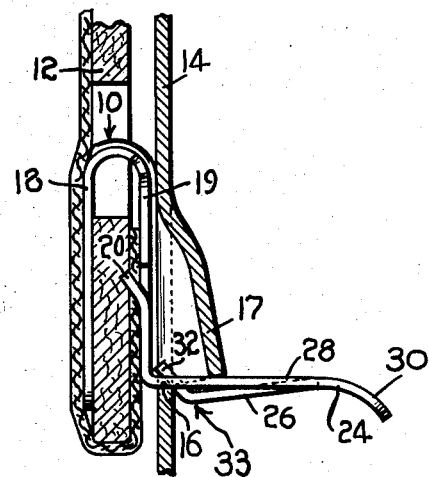
Fig. 6 is a view in elevation, partly in section of the fastener and trim panel secured to the support panel.
Figure 5:
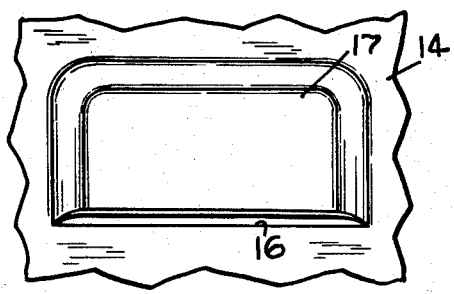
Fig. 5 is a top plan view of the portion of the panel shown in Fig. 4.

Referring to the drawing, there is illustrated a fastening device 10, which is particularly adapted for use in securing a panel 12 to a support 14, having a horizontal slot 16 formed therein. The fastener 10 is preferably formed of relatively strong sheet metal such as carbon steel, and in the illustrated embodiment is formed of a single strip of material bent to provide a panel engaging portion formed by a pair of arms 18 and 19 with projecting tabs 20 and 21 for engagement with the panel, joined at one end by a bight portion 22 and a stud portion 24 extending from arm 19. The stud portion 24 has a longitudinal medial portion 26 sheared from the adjacent portion, forming a pair of arms 28 which are substantially flat and on the same plane. The medial portion 26 and the side portions 28 are integral at their junction at the outer end of the stud 30, and it is bowed outwardly away from the plane of the side portion 28 with the free end 32 bent upward forming a snap shoulder 33.

The supporting panel 14 comprises a piece of sheet metal with a horizontal slot 16; the portion of the panel above the slot is deformed outwardly to form a canopy-like structure 17 over the slot.

The fastener 10 is assembled onto the panel 12 in the usual manner by hooking the arm 18 through a suitably positioned slot in the panel with the projecting tabs 20 and 24 entering into engagement with the fiber panel to retain the fastener in position. The stud 24 is inserted into the slot 16 of the support against the flexing motion of the snap fastener arm 26 which must move toward the plane of the side portions 18 and 19, after the stud is wholly inserted through the slot. The snap shoulder 33 secures the panel firmly in position.

Since certain obvious modifications may be made in the device without departing from the scope of the invention, it is intended that all matters contained herein be interpreted in an illustrative and not in a limiting sense.

I claim:

A panel assembly for automobile and like bodies subjected to water and moisture comprising a trim panel with a fastener and supporting sheet, said supporting sheet having a slot formed therein, a canopy-like water deflecting portion formed in said supporting sheet adjacent to said slot and integral with said supporting sheet on all sides except at the slot, said fastener comprising a base having trim panel engaging means associated therewith, and a stud extending from one end of the base substantially perpendicular thereto, said stud comprising a flat portion extending through said slot and having a flexible snap fastener engaging said supporting sheet adjacent to said slot, said stud having its free end inclined downwardly away from said canopy-like portion to direct water away from said slot and to assist in guiding the stud through said slot.

References Cited in the file of this patent

UNITED STATES PATENTS

| | | |
|---|---|---|
| 2,278,691 | Cotter | Apr. 7, 1942 |
| 2,775,010 | Bedford | Dec. 25, 1956 |